United States Patent Office 3,167,073
Patented Jan. 26, 1965

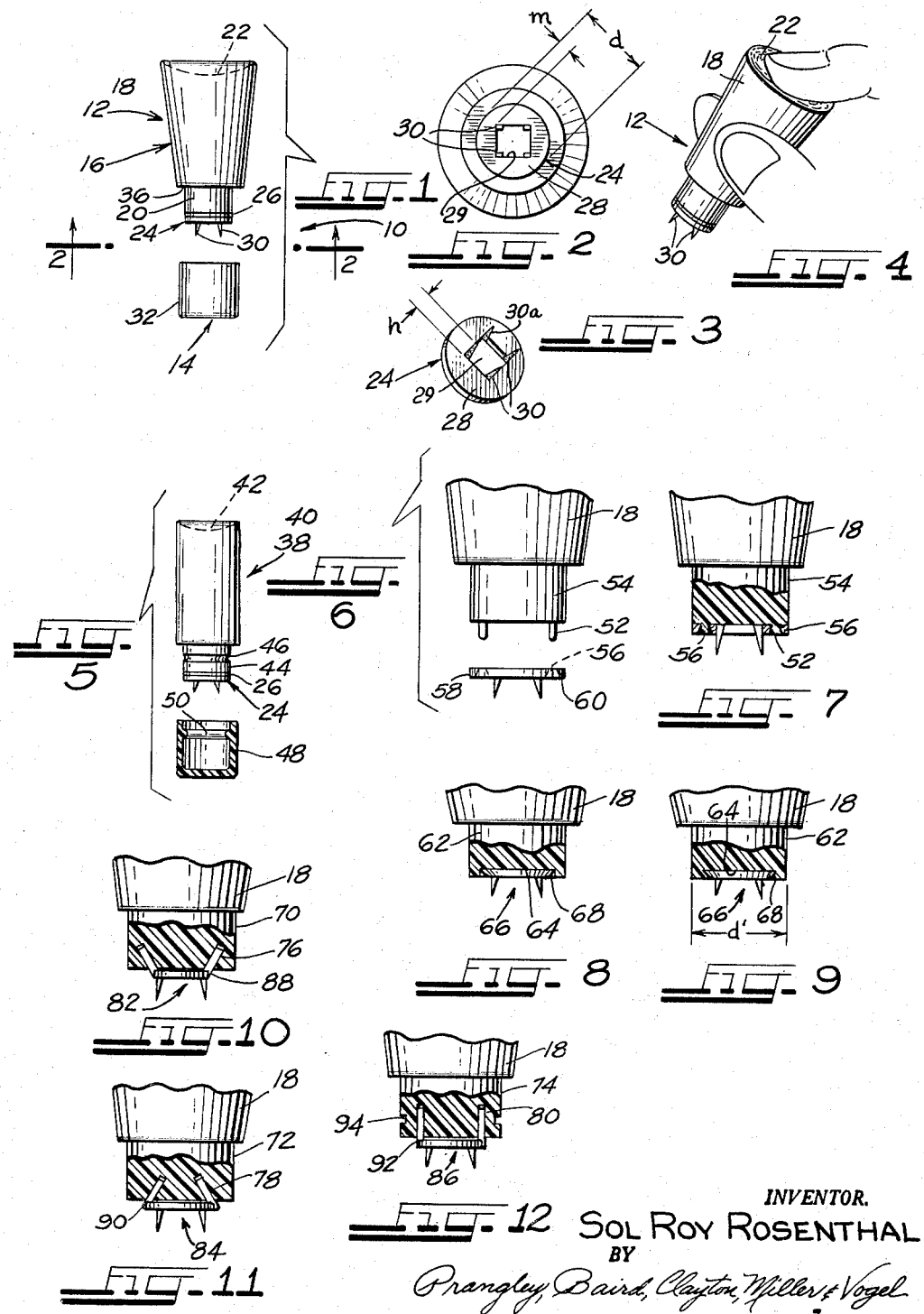

3,167,073
TRANSCUTANEOUS INJECTION DEVICE
Sol Roy Rosenthal, 230 E. Delaware Place, Chicago, Ill.
Filed Jan. 16, 1962, Ser. No. 166,582
4 Claims. (Cl. 128—253)

This invention relates to a new and improved transcutaneous injection device for skin testing or vaccination and the like.

As disclosed in my prior U.S. Patent No. 2,619,962, I have heretofore provided an injection device by which vaccinations or inoculations or skin tests are made by employing a multiple puncture technique which involves introducing a vaccine into the skin transcutaneously by multiple punctures of identical character and depth distributed over an area of the skin. The device disclosed in the patent includes a thin metal plate having needle-like projections punched therefrom and extending in parallel relationship from one side thereof, outwardly beyond the level of the adjacent surfaces of the plate. The plate, as shown in the patent, is provided with a pair of arms extending from opposite sides thereof which may serve as handles or finger pressure points during the use of the device. After cleansing the skin and applying a quantity of vaccine thereto, the device of the patent is placed against the skin and pressed inwardly, thereby forming a plurality of skin punctures with a resulting injection of the vaccine at the site of each puncture, without scarification of the skin.

In my co-pending patent application, Serial No. 787,086, filed January 15, 1959, now Patent No. 3,072,122, issued January 8, 1963, I have disclosed an improved transcutaneous injection device and package which includes inter alia a rigid backing member of moldable plastic material adapted to be held in the fingers, a thin metal plate secured to the backing member, and a plurality of needle-like projections punched from the metal plate and projecting from one side thereof, the projections being adapted simultaneously to puncture the skin at a plurality of points for the purpose of introducing biological substances into the body when the backing member and the metal plate are pressed by the fingers against the skin. The backing member disclosed in that application may include a pair of wing-like projections extending from opposite sides thereof, by which the backing member conveniently may be held in the fingers. Very advantageously, a prepared package is provided, wherein a dried biological substance is present on the needle-like projections for transcutaneous introduction into the body, and a substantially rigid, imperforate protective cover is removably secured to the backing member and covering the metal plate for protecting the needle-like projections and the biological substance thereon from contamination prior to use.

An important object of the present invention is to provide further improvements on my aforesaid injection devices.

A more specific object is to provide a transcutaneous injection device which is particularly well adapted for very rapid and accurate use. In particular, a device is provided which can be grasped at any aspect of its perimeter, and then applied quickly and accurately and with improved visibility during the injection, vaccination or inoculation. The ease and rapidity of injection which is afforded enables the physician to vaccinate or treat large groups of patients within relatively short periods of time.

Another object is to provide a transcutaneous injection device which produces the desired depth of penetration of the injection needles, with neither too great nor too little penetration.

A particular object is to provide a device which accomplishes the foregoing objects and which may be easily grasped and manipulated by the fingers of one hand. More particularly, the device includes a skin perforating member, and a knob secured thereto which may be held with one hand to press the device against the skin.

Another particular object is to provide a device wherein the effective needle length is maintained substantially constant by the mounting method and means which are provided for the skin perforating member.

An additional object is to provide an injection device wherein the construction is maintained within certain important dimensional limits, which have been discovered in the course of the invention, to produce the necessary needle penetration depth when the device is applied to the skin.

A further object is to provide a simple, economical and disposable transcutaneous injection device, and an injection package which includes the device.

These and other objects, advantages and functions of the invention will be apparent on reference to the specification and to the attached drawings illustrating preferred embodiments of the invention, in which like parts are identified by like reference symbols in each of the views, and in which:

FIGURE 1 is a side elevational view illustrating one embodiment of the transcutaneous injection device of the present invention, together with a removable protective cover which may be assembled with the device to provide an injection package, the components of the package being illustrated in exploded relationship;

FIGURE 2 is a bottom plan view on an enlarged scale of the injection device of FIGURE 1;

FIGURE 3 is an enlarged bottom perspective view of the skin perforating member provided in the injection device of FIGURE 1;

FIGURE 4 is a perspective view of the injection device of FIGURE 1, illustrating a preferred manner of grasping it by the fingers of one hand and performing an injection;

FIGURE 5 is a view like FIGURE 1 illustrating an alternative embodiment of the backing member knob and of means for securing the injection device to the protective cover, the latter being shown in cross section; and FIGURES 6 to 12 are enlarged fragmentary side elevational views, illustrating alternate methods and means for securing the skin perforating member to the backing member, with parts broken away and shown in section in several of the views.

In employing the prior transcutaneous injection devices, it has been necessary to grasp each device or the backing member thereof in a predetermined manner, corresponding to the locations of the arms or wing-like projections which have been provided for the purpose. Consequently, there has been a certain loss of time and accuracy in testing or injecting with these prior devices.

In the present invention, the prior disadvantages have been overcome and additional improvements have been achieved by securing a backing member including a knob or thimble to the skin perforating member, the knob being circular in cross section. Thus, it has been discovered and shown by clinical experimentation, wherein test substances were introduced into the skin by transcutaneous injection, that the provision of a cylindrical or conical knob saves considerable time and enables the device to be grasped at any location around its perimeter, eliminating the need for exact placing of the fingers. At the same time, the construction enables the user to grip the injection device more firmly. The underside of the device and the injection area are more readily viewed when injecting, and greater accuracy is achieved.

Injections are much simpler and faster with the new device.

Referring to the drawings, one embodiment of the new injection package is generally indicated by the number 10 in FIGURE 1. The package includes a transcutaneous injection device 12 and a protective cover 14. The injection device includes a backing member 16 comprising an outwardly widening inverted frusto-conical knob or thimble 18 and an integral axially extending cylindrical shank 20 of reduced cross section at the narrow end of the knob. The knob includes an upper transverse end surface which, in the preferred embodiments, includes a central concavity or dished end portion 22 of segmental spherical configuration. The backing member 16 preferably is constructed in one piece of molded thermoplastic resinous material, for example, polystyrene, polyethylene, nylon or Teflon.

A skin perforating member 24 is firmly secured to the base of the shank 20 of the backing member. In the embodiment of FIGURE 1, the perforating member is bound to the backing member by a layer 26 of any suitable adhesive or cement. As more clearly shown in FIGURES 2 and 3, the skin perforating member 24 is constructed in one piece of a thin metal plate 28, having a plurality of needle-like projections 30 punched therefrom, and extending perpendicularly outwardly from the lower or exposed side of the plate. The plate 28 is circular, and the projections lie substantially on the circumference of a circle of lesser diameter and are substantially uniformly spaced therearound.

In the embodiment illustrated, four projections 30 are integral with the plate 28 at the corners of a substantially square opening 29 which is formed during the punching operation. The plate or disc 28 is very thin, for example, about 0.2 millimeter in thickness, and the projections or needles 30 have the same thickness. The needles are triangular in configuration with a relatively small base, and each terminates at its free end in a sharp point.

The protective cover or cap 14 preferably is constructed of a rigid imperforate material, such as one of the aforementioned plastic substances for the backing member, and preferably the cover is translucent or transparent. The cover includes a hollow cup portion 32. The shank 20 of the backing member 12 is received within the cup portion 32 in tight sliding frictional engagement to provide a seal between the two, and the seal is further insured by abutting engagement of the rim of the cup with a shoulder 36 formed at the junction of the knob 18 with the shank 20 on the backing member.

The protective cover 14 insures the sterility of the skin perforating member 24 and especially the needles 30 thereof pending use of the device. The needles 30 are provided with a dried or semi-dried biological substance 30a thereon, and, as just indicated, a sterile closure is made by securing the protective cover 14 on the device. In making an injection, it is necessary merely to remove the cover and press the device against the skin. The injection package 10 is discarded after use. In this manner, a great variety of transcutaneous injections may be made with biological substances including allergens and antigens of different kinds by providing the devices during their manufacture with the desired biological substances on the needles 30. Vaccines which may be injected with the present instrument include, for example, the vaccines for whooping cough, polio, rabies, yellow fever, smallpox, "BCG" for tuberculosis, and others. Examplary testing materials that may be injected include coccidioidin, blastomycin, histoplasmin, lepromin and tuberculin, as well as allergens for foods and pollens.

The injection device 12 is especially adapted for application to the skin in the manner illustrated in FIGURE 4, although it may be employed in other suitable ways. The knob 18 is grasped between the thumb and second finger of one hand, at any location around the periphery of the knob, and the tip of the index finger is placed on the concave surface 22. The injection device is placed on the area to be vacccinated, with the needles 30 on the skin. The needles are pressed into the skin and held for a few moments until the body fluids dissolve the biological substance from the points of the needles. Preferably, the knob may be moved in a slight rotating motion while the needles are embedded in the skin, to insure that the biological substances are removed from the needles and deposited in or beneath the skin. This completes the vaccination or injection, and the injection device is then removed and discarded.

FIGURE 5 illustrates another preferred embodiment of an injection device 38 made in accordance with the invention and having a cylindrical knob or thimble 40 which is circular in cross-section. This knob is likewise adapted for grasping rapidly at any locations around its perimeter, and it is provided with a concave trans-end surface 42, which receives the index finger for pressing the device against the skin. The device includes a shank 44 having a peripheral groove 46 thereabout. A protective cover 48 for the device includes an inner peripheral bead 50 which engages the shank and snaps into the groove 46 to provide a tight seal.

One preferred method for securing the skin perforating member 24 to the backing member 16 is by means of the adhesive or cement layer 26 therebetween, as previously indicated. Several other methods and the resulting articles are illustrated in FIGURES 6 to 12. In the embodiment of FIGURES 6 and 7, integral thermoplastic nib portions 52 project or depend from the backing member shank 54. Two or more nibs may be employed, and they are received in corresponding tapered openings 56 in the metal plate 58 of a skin perforating member that is otherwise like that of the preceding embodiments. When the parts have been assembled, the plastic nibs are melted in the tapered openings 56 to secure the two together, and the plastic is flush with the outer surface 60 of the plate, as shown in FIGURE 7. This construction provides a melted plastic interlocking junction of the backing member and the perforating member.

In the embodiment of FIGURES 8 and 9, a backing member shank 62 includes a cylindrical recess 64. A skin perforating member 66 similar to the embodiment of FIGURE 3 includes an inwardly widening rounded periphery 68, which is received within the shank recess. With the parts assembled, the edges of the thermoplastic shank 62 are melted or fused so that they over-lay the periphery of the perforating member and are flush with the outer surface of the metal plate of the member, as shown in FIGURE 9, again forming a melted plastic interlocking junction between the backing member and the perforating member.

In the embodiments of FIGURES 10–12, the backing member shanks 70, 72 and 74 are provided with slots 76, 78 and 80, respectively, in the ends thereof. Skin perforating members 82, 84 and 86 are employed which are constructed like the embodiment of FIGURE 3, and in addition, include pairs of inwardly or upwardly extending flanges or wings 88, 90 and 92 respectively. The flanges mate with the grooves or slots in the respective shanks, and are inserted therein to hold the parts together. The thermoplastic shanks also may then be melted or fused tightly to close the slots and thus provide a rigid connection. In the embodiment of FIGURE 12, recesses 94 are provided in the shank 74 adjacent to the groove 80, and heat may be applied in the recesses to melt or fuse the plastic in this area.

Employing one of the foregoing constructions or equivalent means of securing the skin perforating member to the backing member, the skin perforating member may be fabricated by precise methods and assembled with a backing member of, preferably, plastic material, which, may be produced in quantity in any convenient manner. The resulting injection devices subsequently may be used with the assurance that the needles 30 will properly penetrate the skin.

Due to the somewhat pliable but resilient nature of the flesh of the human body, and due to the nature of the human skin and its resistance to penetrate, it has been discovered that certain dimensional relationships of those portions of the present injection device which engage the skin and are pressed against the flesh during use of the device, are important for obtaining consistently the best results. In this regard, it has been found that the length of the needles, and the transverse dimension from the edge of the flat surface which contacts the body, to the nearest needle, are of importance. In this connection, it has been found that the height or length of the needles 30, which is represented by the letter $h$ in FIGURE 3, should be in the range of from about 2 to 2.5 mm., this being their length as punched from the metal plate 28. This metal plate 28 is mounted on the injection device so that the plate represents the lowermost or base surface adjacent to the needles, thereby providing a maximum penetration depth of the needles equal to their predetermined length or height $h$ between the outer side of the plate and the tips of the needles.

In the embodiments such as represented in FIGURE 2, the base surface of the device which contacts the skin is the outer or under side of the metal plate 28, as stated above, and it has a diameter indicated at $d$. In the embodiment of FIGURE 9, the diameter of the contacting surface, on the other hand, includes a portion of the shank 62, and is represented by $d'$. It has been found that this dimension $d$ and $d'$ is also important for consistently good test results. The diameter $d$ or $d'$ should be not less than 8 to 10 mm. when a four-needle device is employed. With a lesser diameter, there is a tendency for the needles to burrow too deeply into the skin or flesh and cause bleeding, which should be avoided to prevent flushing of the injected substances. For most purposes the needles should be spaced from 4 to 10 mm. apart, and it will be understood that the overall diameter $d$ or $d'$ will necessarily vary depending upon the number of needles employed and the spacing therebetween. Furthermore, in the use of the present device with four needles in tuberculin testing, it has been found that the dimension $d$ and $d'$ should not exceed 10 mm., since with a greater dimension there is a tendency for the needles 30 to be hindered in their penetration of the skin, so that the injection is not as deep as desired and false negative reactions may sometimes be encountered.

As indicated above, it has further been discovered that the width or dimension of the margin or periphery of the base surface outside the needles is very important in obtaining consistently good and reproducible results. This dimension is indicated at $m$ in FIG. 2, and it should not be less than 1.5 mm., nor greater than 3.5 mm. A lesser dimension causes the needles that are closest to the margin to penetrate too deeply due to the nature of human flesh and skin, and a greater dimension causes those needles not to penetrate as deeply as desired. In using the present device with four needle injection in tuberculin testing, for example, a margin dimension $m$ of from about 1.5 mm. to 2.5 mm. has been found to be ideal.

The present invention provides a transcutaneous injection device which is well suited for rapid, accurate and highly effective use. The device is readily grasped and easily and quickly applied with one hand. Extensive testing has demonstrated that consistently good results may be achieved.

It will be apparent that various changes and modifications may be made in the construction and arrangement of the new injection device and injection package within the spirit and scope of the invention, and it is intended that such changes and modifications be included within the scope of the appended claims.

I claim:

1. A transcutaneous injection device which comprises a thin metal disc having a plurality of needle-like projections punched therefrom and extending perpendicularly from one side thereof for a distance of 2 to 2.5 mm., a dried biological substance on said needle-like projections, and a knob secured to said disc and extending from the opposite side thereof, for holding the knob with one hand to press the device against the skin, said projections being adapted to puncture the skin at a plurality of points for the purpose of introducing said biological substance into the body when the device is pressed against the skin, said one side of the disc providing at least a portion of an outermost surface on said device adjacent to said projections, for limiting the penetration depth of the projections, the periphery of said outermost surface surrounding said projections and lying transversely outwardly at a distance therefrom of 1.5 to 3.5 mm.

2. A transcutaneous injection device which comprises a thin metal plate having a plurality of needle-like projections punched therefrom and extending outwardly from one side thereof, a thermoplastic backing member secured to said plate and including a knob extending from the opposite side thereof, for holding the knob with one hand to press the device against the skin, said projections being adapted to puncture the skin at a plurality of points for the purpose of introducing biological substances into the body when the device is pressed against the skin, said one side of the plate comprising the outermost surface on said device adjacent to said projections, for providing a predetermined limiting penetration depth of the projections corresponding to the distance between said one side and the tips of said projections, said backing member being secured to said plate by a melted plastic interlocking junction of the two.

3. An injection device as defined in claim 2 wherein said backing member includes projecting portions and said plate includes openings receiving said projecting portions to provide said junction.

4. An injection device as defined in claim 2 wherein said backing member includes a recess and said plate includes an inwardly thickening periphery received within said recess to provide said junction.

References Cited by the Examiner

UNITED STATES PATENTS

| 585,007 | 6/97 | Rambaud | 128—253 |
|---|---|---|---|
| 1,467,231 | 9/23 | Cox | 128—253 |
| 2,695,612 | 11/54 | Fields | 128—218P |
| 2,817,336 | 12/57 | Kravitz | 128—253 |
| 2,876,774 | 3/59 | Kravitz | 128—253 |
| 2,893,392 | 7/59 | Wagner | 128—253 |
| 2,974,787 | 3/61 | Cooper | 128—253 |
| 3,034,507 | 5/62 | McConnell | 128—253 |

OTHER REFERENCES

A Simplified Technique for Vaccination Against Smallpox, reprint from Pediatrics, vol. 27, No. 2, February 1961, pp. 219–226.

RICHARD A. GAUDET, *Primary Examiner.*

RICHARD J. HOFFMAN, JORDAN FRANKLIN,
*Examiners.*